US010430384B1

(12) United States Patent
Desai

(10) Patent No.: US 10,430,384 B1
(45) Date of Patent: Oct. 1, 2019

(54) GLOBAL DATA DEDUPLICATION ACROSS MULTIPLE DISTRIBUTED FILE SYSTEMS

(71) Applicant: EMC IP Holding Company LLC, Hopkinton, MA (US)

(72) Inventor: Rajiv Desai, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 526 days.

(21) Appl. No.: 15/080,437

(22) Filed: Mar. 24, 2016

Related U.S. Application Data

(63) Continuation-in-part of application No. 14/755,789, filed on Jun. 30, 2015.

(51) Int. Cl.
*G06F 16/00* (2019.01)
*G06F 16/174* (2019.01)
*G06F 16/182* (2019.01)

(52) U.S. Cl.
CPC ........ *G06F 16/1748* (2019.01); *G06F 16/182* (2019.01)

(58) Field of Classification Search
CPC ......... G06F 17/30156; G06F 17/30194; G06F 16/1748; G06F 16/182
USPC ....................................................... 707/692
See application file for complete search history.

(56) References Cited

U.S. PATENT DOCUMENTS

| | | | |
|---|---|---|---|
| 7,873,619 B1 | 1/2011 | Faibish | |
| 8,621,121 B1 | 12/2013 | Bappe | |
| 9,189,414 B1 | 11/2015 | Shim | |
| 9,424,269 B1 | 8/2016 | Gipp | |
| 2010/0332401 A1* | 12/2010 | Prahlad | G06F 17/30082 705/80 |
| 2011/0093471 A1 | 4/2011 | Brockway | |
| 2012/0158670 A1 | 6/2012 | Sharma | |
| 2013/0041872 A1 | 2/2013 | Aizman | |
| 2013/0218847 A1 | 8/2013 | Saika | |
| 2013/0282673 A1 | 10/2013 | Fiske | |
| 2014/0059017 A1* | 2/2014 | Chaney | G06F 17/30595 707/692 |
| 2014/0115258 A1 | 4/2014 | Week | |
| 2014/0143213 A1 | 5/2014 | Tal | |
| 2014/0188812 A1 | 7/2014 | Vijayan | |
| 2014/0304357 A1* | 10/2014 | Bestler | G06F 17/30 709/213 |
| 2015/0134797 A1 | 5/2015 | Theimer | |
| 2016/0041777 A1 | 2/2016 | Tripathy | |

\* cited by examiner

*Primary Examiner* — Monica M Pyo
(74) *Attorney, Agent, or Firm* — Workman Nydegger

(57) ABSTRACT

A write request is transmitted from a client to a metadata server ("MDS"), wherein the write request comprises an object identifier associated with a data object. An object store location is received for an object store from the MDS. A metadata request is transmitted to the object store using the object store location, wherein the metadata request includes the object identifier. A metadata response is received from the object store. Determine the metadata response contains an object designator. A count associated with a mapping between the object identifier and the object designator is incremeneted, wherein the mapping resides on an object version manager shared with a second MDS.

6 Claims, 3 Drawing Sheets

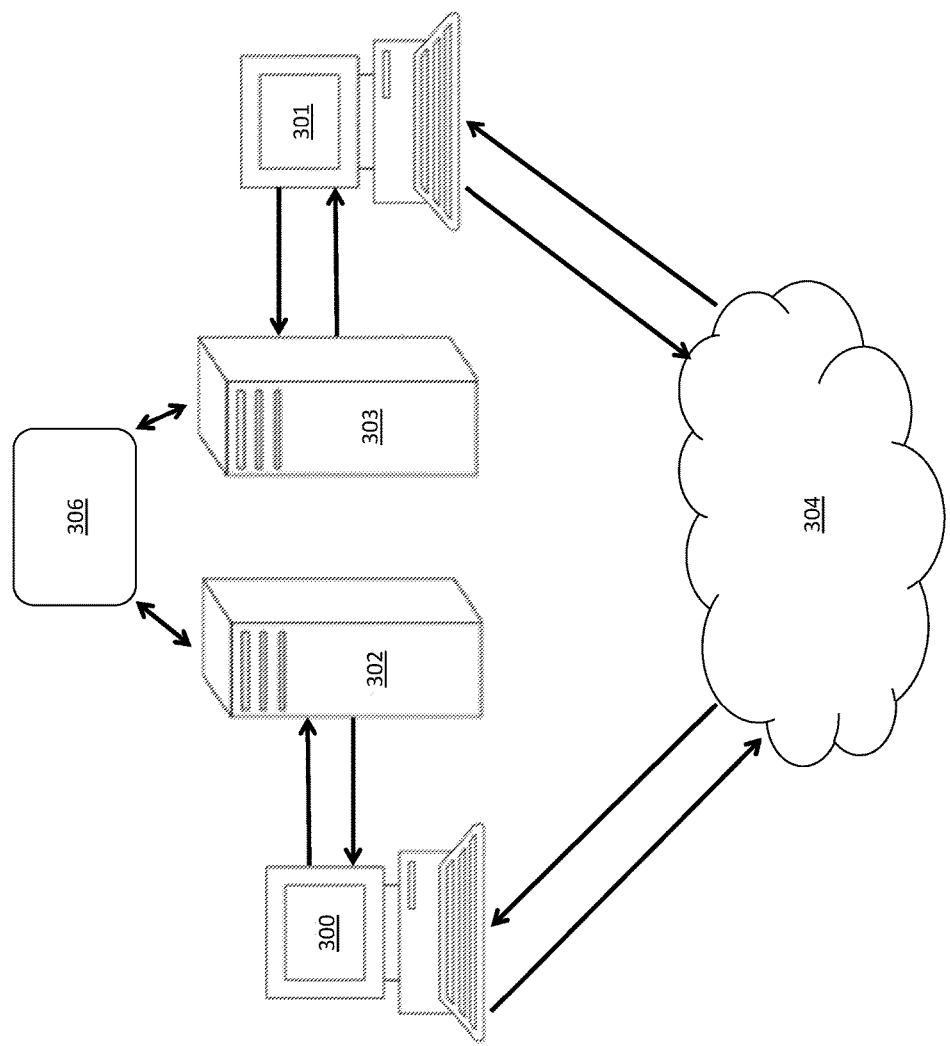

GLOBAL DATA DEDUPLICATION ACROSS MULTIPLE DISTRIBUTED FILE SYSTEMS

CROSS REFERENCE TO RELATED APPLICATIONS

This application claims priority and is a continuation in part of co-pending U.S. patent application Ser. No. 14/755,789, filed Jun. 30, 2015, which is incorporated herein by reference for all purposes. This application is related to co-pending U.S. patent application Ser. No. 15/080,448 for A DATA DEDUPLICATION ON A DISTRIBUTED FILE SYSTEM USING CONDITIONAL WRITES, filed concurrently herewith and incorporated by reference for all purposes.

FIELD OF THE INVENTION

This invention relates generally to distributed file systems, and more particularly to systems and methods for deduplicating data on distributed file systems.

BACKGROUND OF THE INVENTION

Distributed file systems manage files and folders spread across multiple computers. They may serve a similar function as traditional file systems, but are designed to provide file/folder storage and controlled access over local and wide area networks. Some individuals and/or enterprises may rely on distributed file systems to manage their personal and/or organizational data.

There is a need, therefore, for an improved method, article of manufacture, and apparatus for accessing a distributed file system.

BRIEF DESCRIPTION OF THE DRAWINGS

The present invention will be readily understood by the following detailed description in conjunction with the accompanying drawings, wherein like reference numerals designate like structural elements, and in which:

FIG. 3 system for deduplicating data across multiple distributed file systems consistent with an embodiment of the present disclosure.

DETAILED DESCRIPTION

Figure 1:
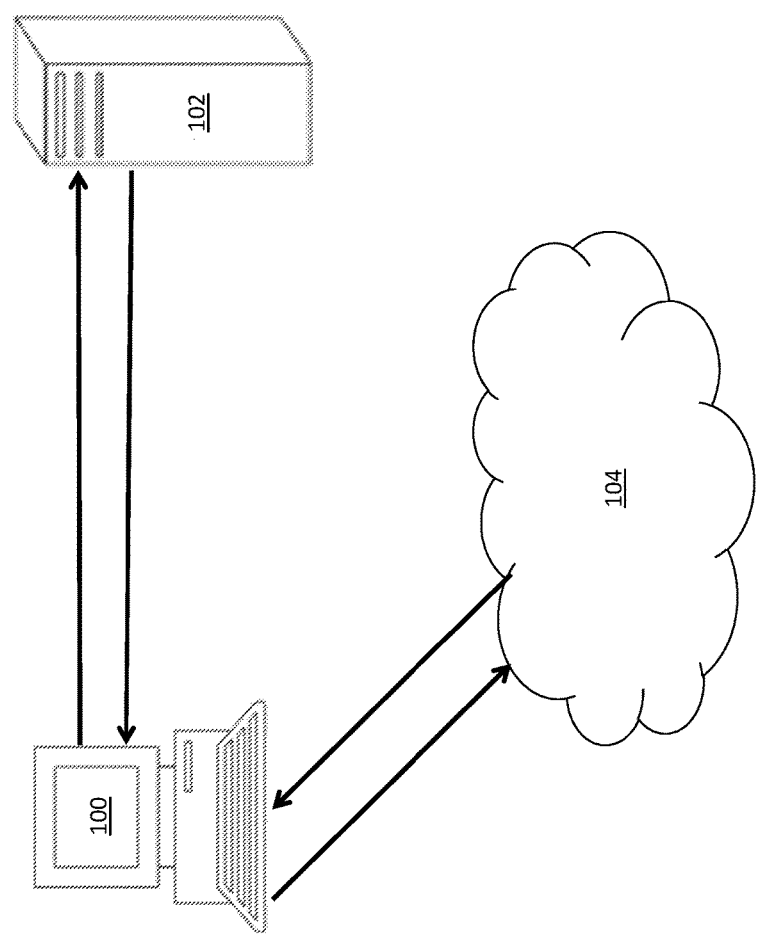
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure enable data deduplication on a distributed file system. Distributed files systems may be used to manage files, folders, and other data spread across multiple computing systems. They may be presented to users, applications, or other clients as traditional file systems, but may actually provide access to data over local and wide area networks. For example, the data could be store in a cloud based object stores, such as Amazon S3, Microsoft Azure, Google Drive, a private object store, and/or a hybrid object store. Access to the data on these object stores may be managed by a metadata server, which could be a local or remote server from the client.

FIG. 1 depicts a system implementing a distributed file system in a cloud environment. The system of FIG. 1 may include client 100, metadata server ("MDS") 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Additionally or alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be a Microsoft Azure install operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other type of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system, and <object identifier> identifies the object to be read.

In an embodiment, the object identifier is a unique identifier for the data object, and may be used to read/write the data object to the object store as discussed herein. The object identifier could be, for example, a hash of the data object. In some embodiments, the object identifier may be the hash of the hash of the data object, where at least the second hash is a one way hash, i.e. hash(hash(data)), which may be referred to as the object name. Using the object name, rather than just a hash of the data, may enhance system security. Storing the data object using only the hash of the data may allow anyone with that hash to decrypt the data using the hash as a key if the data object is encrypted using a deterministic encryption system keyed by the hash of the plaintext data. Using the object name however, enables an object to be uniquely identified without giving the object name holder access to the underlying data.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object.

Upon receiving the intent, MDS 102 may consult a data structure or database table (e.g. deduplication table) to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist. This check may be referred to as a deduplication check.

In some embodiments, performing the object identifier check on MDS 102 may be cost prohibitive. As more objects are added to the system, the data structure containing existing object identifiers may grow making lookups expensive. If the lookup sequence is distributed pseudo-randomly in the space of object identifier values, such as when using a hash, then data structure indices may not reduce these costs. Offloading the deduplication check to an object store and/or client may improve the distributed file system performance.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If the deduplication check determines object store 104 does not have a copy of the data object (e.g. the object identifier is not found in the data structure), it may create a new entry for the object as discussed above. MDS 102 may additionally provide an object location back to client 100, and associate this object location with the new entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST, PUT, or other data transmission method, such as a data transmission method defined by the object store API. The POST or PUT request may include the data object client 100 wishes to store on object store 104. Client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. The data chunks may be uniquely addressable and immutable, meaning they are not changed on the object store once they have been written. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
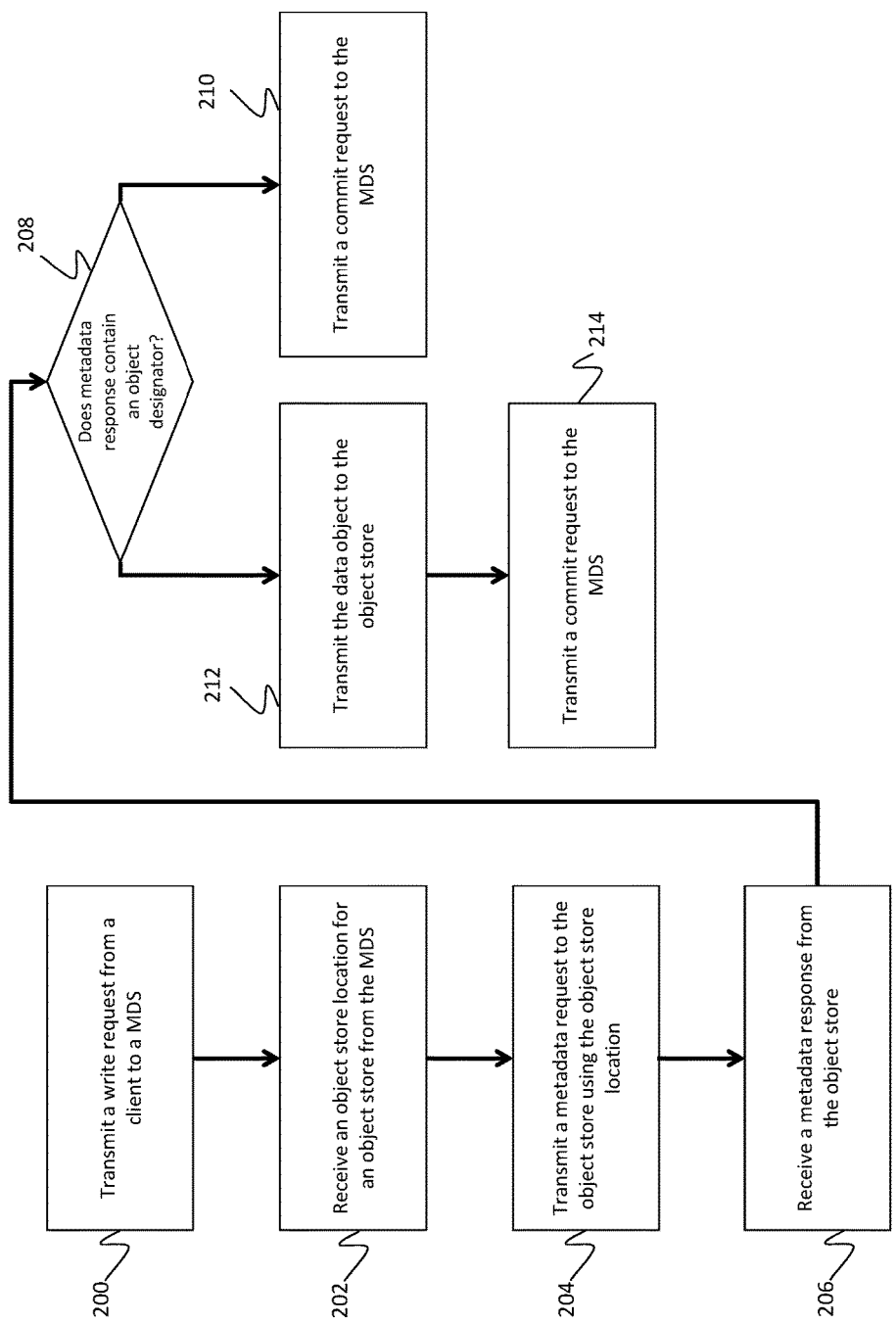
FIG. 2 depicts a process for deduplicating data on a distributed file system consistent with an embodiment of the present disclosure.

Turning now to FIG. 2, a process for offloading deduplication to the object store is discussed. Offloading the deduplication process to the object store may reduce processing and storage costs at the MDS. For example, the MDS may no longer need to maintain the deduplication data structure discussed above. In an embodiment, offloading deduplication to the object store involves issuing a metadata request to the object store prior to transmitting the data object itself. If the object store returns a "true" metadata response, the client may know the object store already contains the data and it does not need to be transmitted a second time. If the object store returns a "false" metadata response, the client may transmit the data object to the object store for persistent storage. In an embodiment, the metadata request may be a RESTful API request, such as a HEAD request or a conditional PUT.

At block 200, a client may transmit a write request to a MDS. This transmission may be substantially similar to the write requests discussed above, and in an embodiment includes one or more object identifiers. In some embodiments, the MDS may not perform a deduplication check upon receiving the write request. Instead, the MDS may assign an object designator to the object identifier. The object designator may be an integer that uniquely identifies each data object/object identifier. For example, the first object identifier the MDS receives may be assigned the object designator 0, the second object identifier the MDS may be assigned an object designator 1, et seq. This assignment allows a single data object to be identified using either the data object identifier (e.g. a hash of the data object) or the object designator. In an embodiment, the MDS stores the object designator to object identifier mapping in a table at this time.

At block 202, the client may receive an object store location for an object store from the MDS. This object store location could be, for example, a URL as discussed above. In an embodiment, the client may also receive the object designator assigned to by the MDS. If multiple object identifiers were submitted to the MDS, the client may receive multiple object designators. The client may store the object designator locally, and/or associate it with the object identifier and/or data object.

At block 204, the client may issue a metadata request to the object store at the object store location. This metadata request may be a deduplication check to determine whether the object store already contains the data object the client wishes to write. In some embodiments, the metadata request may comprise a HEAD request containing the object identifier. HEAD requests may be similar to GET requests, except that the object store will not return a message body. This HEAD request may allow the client to determine whether the object store already contains a copy of the data object, without undue processing.

In some embodiments, the metadata requests may occur in the background while other data requests are queued and processed. For example, a client may queue multiple data objects for transmission to the MDS, such as though PUT requests. The client may simultaneously transmit metadata requests in the background while queuing the PUTs.

Additionally or alternatively, the metadata request may comprise a conditional write request. In some embodiments, a conditional write request may contain the data object associated with the object identifier, and may be a conditional PUT. Unlike a normal write or PUT request, the object store may check to determine whether the object store contains the object before actually storing the object. If the object is already present on the object store, it may not be stored a second time. If the object is not present on the object store, it may be written as it would with a standard write or PUT request.

At 206, a response to the metadata request may be received from the object store. If the metadata request was a HEAD request, this response may not include a message body. The response may, however, include metadata in the header. The metadata may be related to the data object, and in an embodiment the header metadata may include an object designator if the object store already contains a copy of the data object. Similarly, the header may not contain an object designator if the object store does not contain the data object. In some embodiments, the metadata response may be an error, such as a 404 error, and not include any metadata.

If the metadata request was a conditional PUT request, the response may comprise a HEAD-like response with a custom status code and/or a write successful response, such as a 200 code. If the response comprises a HEAD-like response with an object designator, the client may know the object store already had a copy of the data object in the conditional write. This may enable the process to continue without transmitting any further data to the object store, such as an additional PUT request. If the response includes a write successful response, the client knows that the object store did not previously contain a copy of the data object, but it does now and no further transmissions to the object store are necessary. If the client receives an error, the state of the data object on the object store may be unknown and the data object may need to be transmitted again.

At block 208, a check is made to determine whether the response contains an object designator and/or, in the case of a conditional write, a write successful. If the client receives a metadata response containing an object designator or a write successful, the client may transmit a commit request to the MDS at 210. In an embodiment, the client does not need to transmit the data object to the object store first because the data object already exists on the store. The commit request may include the object designator received from the object store.

The MDS may increase a count associated with the object designator when it receives the commit request from the client. As noted above, object designators may be associated with and/or map to object identifiers. Increasing a count associated with the object designator allows the MDS to track how many instances of the object designator's associated data object exist in the distributed file system. For example, if a data object were located in four directories on the distributed file system, the count associated with that object's object designator would equal four. If the data object were deleted from one of the folders, the count would be decremented by one. When a data object is written, as in the present embodiment, the count may be increased by one. If the count ever reaches zero, the data object may no longer be in the system and the association may be deleted completely.

In some embodiments, the MDS may cross-check the count associated with an object designator before incrementing it. This enables the system to ensure data integrity by protecting against false deduplication positives. For example, the deduplication check at block 208 may return an object designator, thereby indicating the object store contains the data object. The data object may, however, have already been deleted from the distributed file system, but a garbage collection routine has not removed it from the object store. Alternatively, a different client may delete the data object before the present client transmits the commit request to the MDS. Cross-checking the count prevents protects against these issues.

For example, the MDS may determine that a client has submitted a commit request for an object designator with a count equal to zero. In such an embodiment, the data object is not used anywhere else in the distributed file system, and therefore may be queued for garbage collection on the object store. Similarly, the MDS may not have a record of the object designator provided by the client, indicating the data object has been deleted and the associate removed. In such an instance, the data object may need to be retransmitted to the MDS with either a new or the previous object designator to preserve the data integrity. The MDS may respond to the client with a write instruction, and the client may continue as though the check at 208 were false.

If the check at 208 determines the metadata response is false and does not include an object designator, such as in the event of an error, the process may continue to block 212. In this embodiment, the object store may not contain a copy of the data object. The client may therefore need to transmit the data object to the object store for persistent storage.

At block 212, the data object may be transmitted to the object store. In an embodiment, the data object may be part of a PUT request as discussed above. Additionally, transmitting the data object to the object store may include transmitting data object metadata. For example, the client may transmit the object designator. This will enable the object store to return that object identifier in response to a metadata request if a client wishes to write the same data object in the future.

Finally, at block 214, the client may transmit a commit request to the MDS. This commit process may be substantially similar to that discussed in reference to block 210, except the MDS will create a new object designator/object identifier mapping since the data object is new. The new mapping's count would likely equal one.

In some embodiments, multiple clients may attempt to write the same new data object to the object store at the same time. This may result in both clients receiving a metadata response without an object designator at block 206 since neither client has written the data object yet. If they both proceed to write the data object, the MDS will have two object designators for the same data object, and each object designator will have a count of at least one. When one of the clients attempts to delete their data object, the MDS may decrement the count to zero. The MDS may queue the data object for garbage collection since the count is zero, and subsequently remove it from the object store. This may compromise the distributed file system's data integrity since the other client may still use the data object.

To protect against this issue, object versioning may be enabled on the object store. Object versioning enables the object store to contain multiple instances of the same object. Upon receiving a delete instruction, the object store will delete the latest version of the object, not necessarily the object itself. Versions are thereby deleted one at a time. In the above scenario, the same object may have two versions on the object store, one created by each client. When the MDS performs garbage collection and instructs the object store to delete the data object upon the first object designators count equaling zero, the object store will delete one of the versions. The other version, however, will not be deleted and will still be available on the distributed file system.

An additional or alternative mechanism for protecting against accidentally deleting objects may be to maintain an in-flight reference at a MDS for data objects that have not been committed to the object store. For example, two clients may request to write the same data object to an object store at substantially the same time. Rather than issuing two object designators, a client may update an in-flight data structure mapping the object identifier to the object designator. When the second client issues a request, the MDS may inform the second client that the data object is in-flight and return the object designator. Once either of the clients have transmitted the data object to the object store, the client may inform the MDS which may move the reference from the inflight data structure to the standard mapping.

Turning now to FIG. 3, a system for deduplicating data over multiple MDSs is discussed. The system shown in FIG. 3 may be substantially similar to that depicted in FIG. 1. For example, the system may include client 300, MDS 302, and object store 306. The system of FIG. 3 may also include client 301, MDS 303, and version manager 306.

In some embodiments, MDS 302 and MDS 303 may be part of the same distributed file system belonging to the same tenant. Additionally or alternatively, they may comprise separate distributed file systems belonging to separate tenants. This may enable global deduplication for a plurality of tenants, even if those tenants do not share the same distributed file system.

The system depicted in FIG. 3 may also include version manager 306. In an embodiment, version manager 306 may be a process and/or data structure for managing object designators, such as those discussed above. Rather than storing object designators in a manner that is only accessible by a single MDS and/or distributed file system, version manager 306 may be accessible by multiple MDSs comprising multiple distributed file systems. For example, version manager 306 may be accessible by both MDS 302 and MDS 303.

In some embodiments, when a commit request is transmitted to an MDS, such as at blocks 210 and 214 above, it may alternatively or additionally be transmitted to version manager 306. This version manager may maintain the count for the associated object identifiers. At the commit, the object designator may be transmitted to the version manager either from the client itself or the MDS. Maintaining these counts apart from the distributed file system may enable global deduplication for data objects common to multiple tenants. Version manager 306 may perform all of the object designator functions, such as cross-checking, discussed above.

Version manager 306 may exist independently from MDS 302, MDS 303, and/or object store 304. Additionally or alternatively, version manager 306 may exist on one or more of these components, provided it is accessible by each MDS and can access object store 304.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for deduplicating data across multiple distributed file systems, the method comprising:
    providing an object version manager that is accessible by a first distributed file system associated with a first metadata server ("MDS") and that is accessible by a second distributed file system associated with a second MDS, wherein the first distributed file system is separate from the second distributed file system;
    transmitting a write request from a client to the first MDS, wherein the write request comprises an object identifier associated with a data object;
    receiving an object store location for an object store from the first MDS;
    transmitting a metadata request to the object store using the object store location prior to transmitting the data object, wherein the metadata request includes the object identifier and wherein the object store is separate from the first MDS;
    receiving a metadata response from the object store to the metadata request;
    determining the metadata response contains an object designator; and
    incrementing a count associated with a mapping between the object identifier and the object designator in the object version manager shared with the second MDS included in the second distributed file system;
    tracking how many instances of the data object are stored in the first distributed file system and in the second distributed file system using the object version manager and the object designator; and
    maintaining the count in the object version manager and apart from the first distributed file system and the second distributed file system; and
    globally deduplicating data objects common to the first distributed file system and the second distributed file system using the object version manager.

2. The method of claim 1, wherein the object version manger resides on one of the first MDS and the second MDS.

3. The method of claim 1, wherein the object version manager resides in the object store.

4. A non-transitory computer readable storage medium comprising processor instructions for deduplicating data across multiple distributed file systems, the instructions comprising:
    providing an object version manager that is accessible by a first distributed file system associated with a first metadata server ("MDS") and that is accessible by a second distributed file system associated with a second MDS, wherein the first distributed file system is separate from the second distributed file system;
    transmitting a write request from a client to the first MDS, wherein the write request comprises an object identifier associated with a data object;
    receiving an object store location for an object store from the first MDS;
    transmitting a metadata request to the object store using the object store location prior to transmitting the data object, wherein the metadata request includes the object identifier and wherein the object store is separate from the first MDS;
    receiving a metadata response from the object store to the metadata request;
    determining the metadata response contains an object designator; and
    incrementing a count associated with a mapping between the object identifier and the object designator in the object version manager shared with the second MDS included in the second distributed file system;
    tracking how many instances of the data object are stored in the first distributed file system and in the second distributed file system using the object version manager and the object designator; and
    maintaining the count in the object version manager and apart from the first distributed file system and the second distributed file system; and globally deduplicating data objects common to the first distributed file system and the second distributed file system using the object version manager.

5. The computer readable storage medium of claim 4, wherein the object version manger resides on one of the first MDS and the second MDS.

6. The computer readable storage medium of claim 4, wherein the object version manager resides in the object store.

\* \* \* \* \*